(12) United States Patent
Kravitz et al.

(10) Patent No.: US 8,781,934 B2
(45) Date of Patent: *Jul. 15, 2014

(54) PRE-PAID FINANCIAL SAVINGS AND INVESTMENT CARD SYSTEM

(71) Applicant: DreamFund Holdings, Inc., Wilmington, DE (US)

(72) Inventors: Joel A. Kravitz, Boca Raton, FL (US); Ryan Mersand, Boca Raton, FL (US); Steve Mersand, Boca Raton, FL (US); Andrew Kravit, Boca Raton, FL (US)

(73) Assignee: DreamFund Holdings, Inc., Wellesley Hills, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/651,845

(22) Filed: Oct. 15, 2012

(65) Prior Publication Data
US 2013/0041846 A1     Feb. 14, 2013

Related U.S. Application Data

(62) Division of application No. 11/736,775, filed on Apr. 18, 2007, now Pat. No. 8,341,045.

(60) Provisional application No. 60/793,566, filed on Apr. 20, 2006.

(51) Int. Cl.
*G06Q 40/00* (2012.01)

(52) U.S. Cl.
USPC ............................................. 705/35

(58) Field of Classification Search
CPC ........ G06Q 40/00; G06Q 20/29; G06Q 20/22
USPC ...................... 705/2–50; 708/1–55; 235/1–99
See application file for complete search history.

(56) References Cited

U.S. PATENT DOCUMENTS

2003/0218062 A1* 11/2003 Noriega et al. ................ 235/380
2004/0243498 A1* 12/2004 Duke ............................... 705/35

OTHER PUBLICATIONS

James C. McGrath, General-Use Prepaid Cards: The Path to Gaining Mainstream Acceptance, Federal Reserve Bank of Philadelphia, web, 1-30.*

* cited by examiner

*Primary Examiner* — Marissa Liu
(74) *Attorney, Agent, or Firm* — Mintz Levin Cohn Ferris Glovsky and Popeo, P.C.

(57) ABSTRACT

A savings and investment system and method including a plurality of pre-paid investment cards (PPICs) which can be purchased by individuals as investment products for themselves or as gifts for PPIC recipients. The PPICs are pre-paid stored value cards that are provided for use with the investment system by a PPIC company, which establishes relationships with partner financial services providers and partner retailers to provide investment vehicles and the PPICs. The value stored on the PPICs can be redeemed through a PPIC website maintained by the PPIC company or the partner financial services provider(s), whereby the value on the PPIC is deposited in an investment account established for the PPIC recipient, and then allocated among specified investment vehicles. The PPIC purchaser may optionally define usage rules governing how the PPIC value is allocated.

16 Claims, 7 Drawing Sheets

PRE-PAID FINANCIAL SAVINGS AND INVESTMENT CARD SYSTEM

CROSS REFERENCE TO RELATED APPLICATIONS

This application is a divisional application of U.S. application Ser. No. 11/736,775, filed on Apr. 18, 2007, which claims the benefit of U.S. Provisional Application No. 60/793,566, filed Apr. 20, 2006 and entitled "Pre-Paid Financial Investment Card System," the contents of which are incorporated herein by reference in its entirety.

TECHINCAL FIELD

The present invention relates generally to systems and methods of providing and administering savings and investment programs. In particular, the present invention is a saving and investment system utilizing pre-paid stored value investment card, and a method of administering the system.

BACKGROUND

Existing savings accounts, investment systems, and related programs for individuals and organizations have significant limitations. In particular, traditional investment systems provide limited flexibility to individuals who wish to set aside investment funds for themselves or others. For example, with existing investment systems, an individual can either purchase specific investments, e.g., stocks, bonds, mutual fund shares, etc., on another individual's behalf, or can give the recipient cash with the intent that it be used to purchase investment vehicles of the recipient's choosing. In the first case, the recipient has little to no control over the investment decisions. Additionally, this approach can be inconvenient for the purchaser, who generally will be required to purchase the investment product through a broker or other financial entity purchase. On the other hand, gifts of cash or cash equivalents (e.g., checks) provide the grantor with little control over their disposition, because such gifts can be used for non-investment purposes (e.g., entertainment, travel, consumables such as groceries, gasoline, etc.). In short, traditional investment systems do not provide sufficient flexibility or convenience to individuals desiring to purchase variable amounts of investments as gifts or as personal investments.

There is thus a need for an improved investment system that overcomes these and other problems associated with the current investment programs and systems.

SUMMARY

The present invention, in one embodiment, is a savings and investment system comprising at least one activated pre-paid investment card (PPIC) purchased by a purchaser and having a unique security number and a monetary value associated therewith, a database for storing at least the security number and the monetary value, a host computer for accessing and modifying the database, and a user interface operatively coupled to the host computer. The host computer is operable to establish an investment account for a recipient of the activated PPIC, associate in the database the activated PPIC with at the investment account, transfer at least a portion of the monetary value of the activated PPIC to the investment account, and allocate at least a portion of the transferred value to at least one specified investment. The user interface is operatively coupled to the host computer and is accessible by the purchaser and/or the recipient for causing the monetary value to be transferred to the investment account. In another embodiment, the present invention is a method of administering a savings and investment program utilizing the investment system.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

Figure 1:
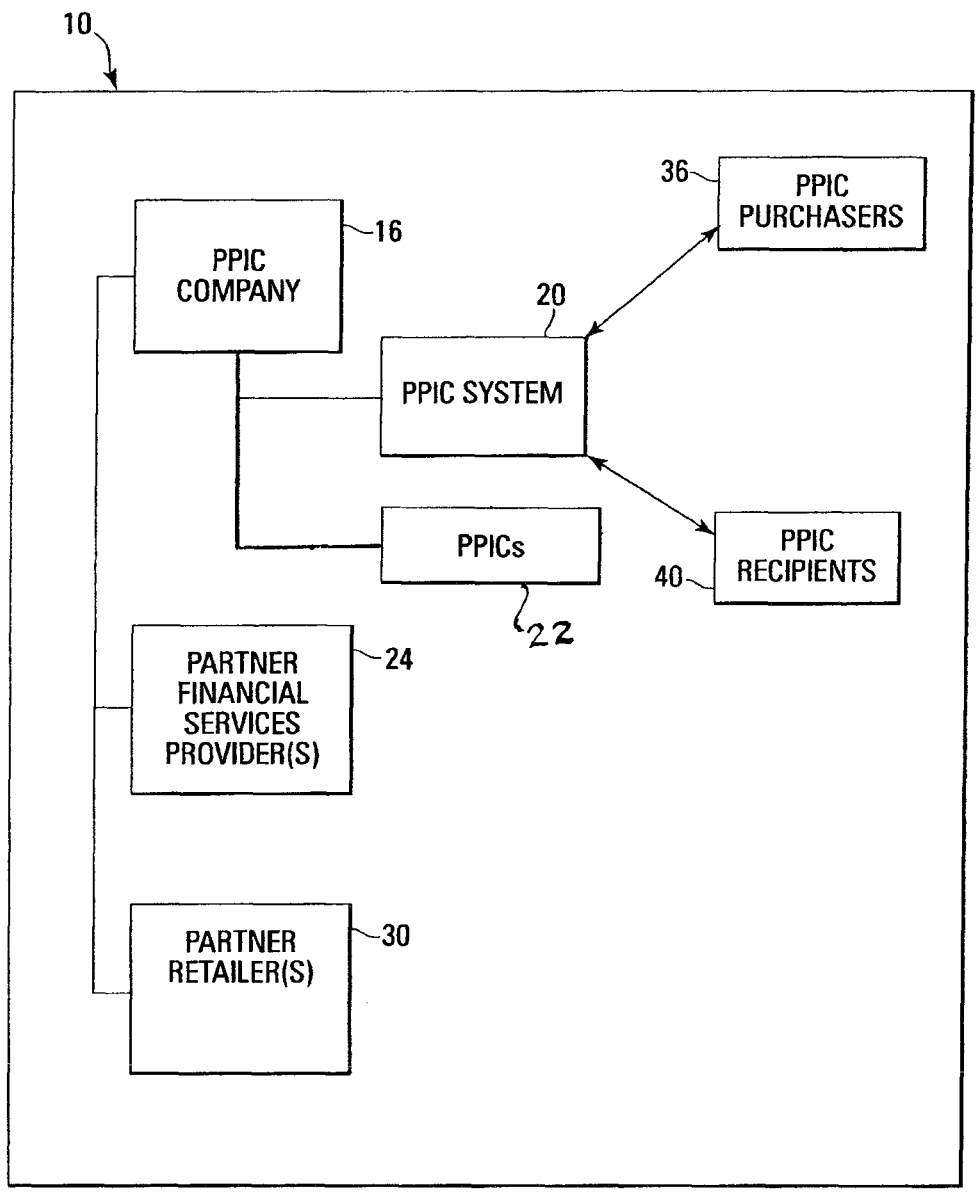
FIG. 1 is a block diagram of a savings and investment program illustrating the relationships between the participating entities according to one embodiment of the present invention.

While the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

FIG. 1 is a block diagram of a savings and investment program 10 utilizing pre-paid investment cards (PPICs) according to one embodiment of the present invention. As shown in FIG. 1, the savings and investment program 10 includes a PPIC company 16 administering a PPIC system 20 and providing a plurality of PPICs 22, partner financial service providers 24, partner retailers 30, PPIC purchasers 36, and PPIC recipients 40. As will be explained in detail below, the PPICs 22 are pre-paid stored value cards that can be purchased through retail merchants, internet locations, or any other participating place of business. The value stored on the PPIC 22 can be transferred to an investment account maintained by the PPIC company 16 and/or a partner financial services provider 24. The PPIC 22 thus constitutes an investment product that is readily accessible to anyone desiring to purchase one, and can be used for personal investments or as gifts for others to use for investment purposes or other designated uses.

In general, the PPIC company 16 administers the savings and investment program 10 and operates the PPIC system 20, either directly or wholly or partly through one of the partner financial services providers 24 or a third party. This includes, in various embodiments, providing and administering investment accounts for the PPIC recipients 40, providing and activating the PPICs 22 (also either directly, or through a third party or one or more of the partner financial service providers 24), and providing an interface through which the PPIC purchasers 36 and PPIC recipients 40 can use their PPICs 22 and manage their investment accounts.

The financial service providers 24 can include any financial services companies with which the PPIC company 16 establishes a relationship for purposes of administering and operating the savings and investment program 10. In various embodiments, the financial service providers 24 can include banks or other financial institutions, brokers (both traditional and online), full service financial planning companies, insurance companies, and other entities providing investment products and vehicles that can be acquired using value stored on the PPICs 22.

The partner retailers 30 operate as PPIC vendors, and can include both "brick and mortar" retail establishments as well as online retailers. Thus, the partner retailers 30 provide an alternative source (in addition to the PPIC company 16 and/or one or more of the financial service providers 24) at which PPICs 22 can be purchased by the PPIC purchasers 36 as investment vehicles for themselves or for PPIC recipients 40 of their choosing. While the potential partner retailers 30 are not limited to any particular type of vendor or retailer, exemplary partner retailers 30 may include greeting card companies, florists, supermarkets, drugstores, discount stores, department stores, web portals, cable and satellite providers, internet service providers, online music and video vendors, etc. In many cases, the foregoing partner retailers 30 may offer other pre-paid stored value card products, e.g., gift cards, phone cards, etc., and thus already have systems for activating and processing such cards. In that case, the PPICs 22 can be readily integrated into their pre-paid product systems. Additionally, offering the PPICs 22 for purchase at such retailers exposes a large number of customers, i.e., potential PPIC purchasers 36, to the PPICs 22. This in turn provides a convenient avenue for these individuals to make investment purchases by purchasing PPICs 22, thereby increasing the likelihood that they will purchase the PPICs 22 even if they might not have otherwise affirmatively sought out an investment product. The savings and investment program 10 thus provides substantial benefits to the PPIC purchasers 36 and the partner retailers 30.

It will be appreciated that in some embodiments, the partner financial service provider(s) 24 may function as the PPIC company 16 in administering and operating the savings and investment program 10 and/or the PPIC system 20. In such embodiments, the savings and investment program 10 need not include a separate PPIC company 16 distinct from the financial service provider(s) 24. Similarly, in various embodiments, the savings and investment program 10 need not include partner retailers 30. In such embodiments, the PPICs 22 may be made available for purchase only through the PPIC company 16 and/or the partner financial services provider(s) 24. In short, the specific configuration of the savings and investment program 10 and the relationships between the PPIC company 16, the partner financial services providers 24, and/or the partner retailers 30 can be tailored in any number of ways.

The purchasers 36 can be any individuals or entities, i.e., corporations or other organizations, that desire to purchase investment products for the purpose of investing for themselves or another individual or entity. For example, the purchasers 36 can include parents who wish to purchase PPICs 22 as investments for their children, grandparents who wish to purchase PPICs 22 as investments for their grandchildren, etc. In short, the savings and investment program 10 places no restrictions on the individuals who can purchase PPICs 22 either for themselves or others. Additionally, the investments obtained using the value stored on the PPICs 22 can be any form of investment vehicles obtainable through the partner financial services provider(s) 24. Such investments can include, without limitation, purchases of stocks or other securities, bonds, mutual funds, certificates of deposit, insurance, and real estate, as well as deposits in savings accounts and money market accounts. The value stored on the PPIC 22 can also be used to fund goal-based investment portfolios such as trust funds, college funds, retirement funds, and the like. In addition, the PPICs 22 can be used for intangible investments such as charitable donations, political donations, and the like.

Figure 2:
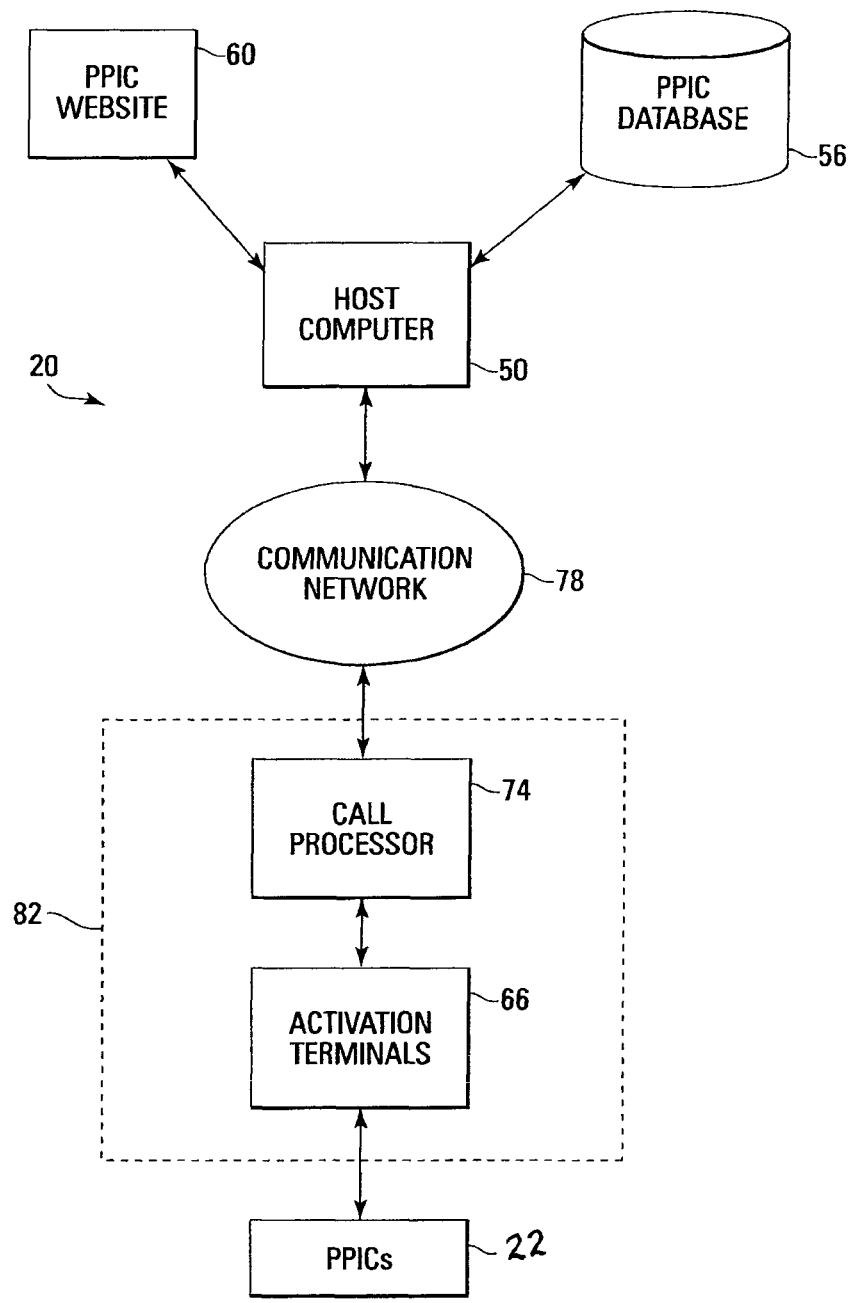
FIG. 2 is a block diagram illustrating the primary functional components of a pre-paid investment card system utilized in conjunction with the savings and investment program of FIG. 1 according to one embodiment of the present invention.

FIG. 2 is a functional block diagram illustrating the primary components of the PPIC system 20 according to one embodiment of the present invention. As shown in FIG. 2, the PPIC system 20 includes the plurality of PPICs 22, a host computer 50, a PPIC database 56, a PPIC website 60, a plurality of activation terminals 66 and a call processor 74. Each of these components is discussed in detail below.

As discussed above, the PPIC 22 is a pre-paid stored value card. The principles underlying the creation and use of stored value cards are generally well known in the art and need not be described in detail here. In short, the pre-paid stored value card is a financial card which generally includes a unique security number to which a stored value is associated. This stored value can represent, for example, the monetary value that the purchaser has "loaded" onto the card at the point of sale or thereafter. Upon activation of the stored value card, the monetary valued stored thereon is essentially immediately available for use by the holder to purchase goods, services, travel, etc. based on the usage rules defined by the card provider. As will be appreciated, the stored value cards such as the PPICs 22 can be activated utilizing systems and processes known in the art, such as are provided by third party stored value card processors. In various embodiments, the PPIC company 16 can utilize such established systems and processes through relationships with the foregoing stored value card processors in order to provide the PPICs 22 to the purchasers 36 and/or recipients 40.

The PPIC 22 can be any form of stored value card, whether currently known or later developed. In one embodiment, the PPIC 22 is similar in appearance and function to a conventional stored value card as is known in the art. In this embodiment, the PPIC 22 includes a body portion and a read-only memory stripe having stored therein various data including a security number. In various embodiments, the body portion may be made from plastic, cardboard, or other suitable material. In one embodiment, the unique security number may be provided in clear text under a suitable blackout, e.g., a scratch-off coating. In one embodiment, the PPIC 22 can be in the form of a paper receipt given to the purchaser 36 at the point of sale, and which can include the security number and any other information required for redeeming the stored value. In still other embodiments, as will be explained in greater detail below, the PPIC 22 is not a physical card, but is instead an electronic record maintained by the PPIC system 20 that has associated with it a unique security number that must be provided in order to redeem the value on the PPIC 22. The stored value on the PPIC 22 can be any monetary value loaded onto the PPIC 22.

In one embodiment, the PPIC 22 is a single use card, and thus becomes void after the stored value is redeemed in full. In other embodiments, the PPIC 22 is "rechargeable" or "reloadable," in that additional value can be loaded onto the PPIC 22 when desired by the purchaser 36 or the recipient 40. In various embodiments, the PPIC 22 may be a non-customizable, single denomination PPIC 22, in that it is provided in a pre-determined monetary denominations, e.g., $100, $500, is redeemable only through one or more particular partner retailers or financial service providers, and/or may be used for only a specific, limited use (e.g., to purchase securities, mutual funds, insurance, real estate, etc., or for use only to make charitable or political contributions, etc.). In other embodiments, the PPIC 22 may be a general use stored value card that is fully customizable, and can be loaded with any monetary value desired by the purchaser 36, and/or can be designated for a specific use or combinations of uses. In some embodiments, the PPICs 22 can only be redeemed through the PPIC system 20. Other variations on the types of PPICs 22 may be based on the particular needs of the PPIC company 16, the partner financial service providers and retailers 24, 30, and/or the PPIC purchasers and recipients 36, 40. In one embodiment, the PPICs 22 may be a branded card carrying the name of one of the partner financial service providers 24, partner retailers 30, or other designated entity. In other embodiments, the PPICs 22 may be issued by other financial institutions or stored value card providers.

The host computer 50 can be any suitable combination of servers and software, and operates to facilitate the management and processing of the PPIC system 20. In the illustrated embodiment, the host computer 50 is connected to a communication network 78, e.g., a telephone network, via an input port for operatively coupling the host computer 50 to the activation terminals 66 through the call processor 74. The host computer 50 further operates to facilitate establishment of investment accounts into which the value stored on the PPICs 22 can be transferred as the PPICs 22 are redeemed by the PPIC recipients 40. Additionally, in various embodiments, the host computer 50 also includes software and hardware for internal use by the PPIC company 16 to perform such functions as report generation and management, database management, and the like.

The PPIC database 56 is accessible and controlled by the host computer 50 for storing investment program data for use by the host computer 50 in administering the savings and investment program 10. For example, the database 56 stores security numbers associated with the PPICs 22, as well as PPIC purchaser 36 and PPIC recipient 40 personal information, PPIC 22 purchase transaction data, and the like. In various embodiments, the database 56 may also operate to store the PPIC recipients' investment account data. In other embodiments, the PPIC investment accounts and associated data may be stored and maintained in separate databases accessible by the host computer 50, such as databases maintained by one or more of the partner financial services providers 24.

The PPIC website 60 is operatively coupled to the host computer 50 and is accessible by the investment program participants, e.g., the PPIC purchasers 36 and PPIC recipients 40. The PPIC website 60 functions as a user interface to the host computer 50 for the PPIC purchasers 36 and the PPIC recipients 40 to purchase PPICs 22, register activated PPICs 22, redeem the value stored on their PPICs 22, recharge or otherwise add funds to existing PPICs 22, open new investment accounts, and manage existing investment accounts. Thus, in one embodiment, the PPIC website 60 operates as the primary interface by which the PPIC purchasers 36 and/or recipients 40 can control and manage the use of the PPICs 22 and the investment accounts of the PPIC recipients 40. In one embodiment, PPIC website 60 may run on the same servers as the host computer 50. In other embodiments, the PPIC website 60 operates on servers independent of the host computer 50. The PPIC website 60 can be hosted and/or managed by the PPIC company 16, by a partner financial services provider 24, or by a third party. In one embodiment, the PPIC website 60 is linked directly to or is integrated with the websites of the partner financial services providers 24.

The activation terminals 66 are data terminals located remotely from the host computer 50 and connected, e.g., via a modem (not shown) to the input port of the host computer 50 via the communication network 78 for transmitting data between the activation terminals 66 and the host computer 50. The activation terminals 66 operate, in part, to provide a system and method for facilitating activation of the purchased PPICs 22 at a physical point of sale, i.e., the physical locations of the PPIC company 16, the partner financial service providers 24, and/or the partner retailers 30. Thus, the activation terminals 66 can constitute conventional stored value card activation terminals commonly in use. In one embodiment, the activation terminal 66 includes a display and means by which the security number associated with a purchased PPIC 22 can be entered. In various embodiments, these means may include a magnetic strip card reader or a keypad for manual entry of the security number. In some embodiments, the activation terminals 66 can also be used to load additional monetary value onto the PPIC 22. For example, in some embodiments, the PPICs 22 may be recharged after the value initially stored on the PPIC 22 has been partially or fully redeemed. In some embodiments, the recipient 40 may desire to consolidate the value stored on several PPICs 22 onto a single PPIC 22. In other embodiments, the PPIC purchaser 36 may desire to add further value to a PPIC 22 previously given to a PPIC recipient 40. In short, the activation terminals 66 can be configured to provide any functionality desired by the PPIC company 16 and/or the partner financial service providers 24 and retailers 30.

The call processor 74 is a software platform that provides, among other things, an interface between the host computer 50 and the activation terminals 66. Thus, in the various embodiments of the present invention, the host computer 50 is configured to interface with the call processor 74. As will be understood by those skilled in the art, the activation terminals 66 and the call processor 74 are components of a known stored value card processing system 82 that can be utilized in the PPIC system 20.

Figure 3:
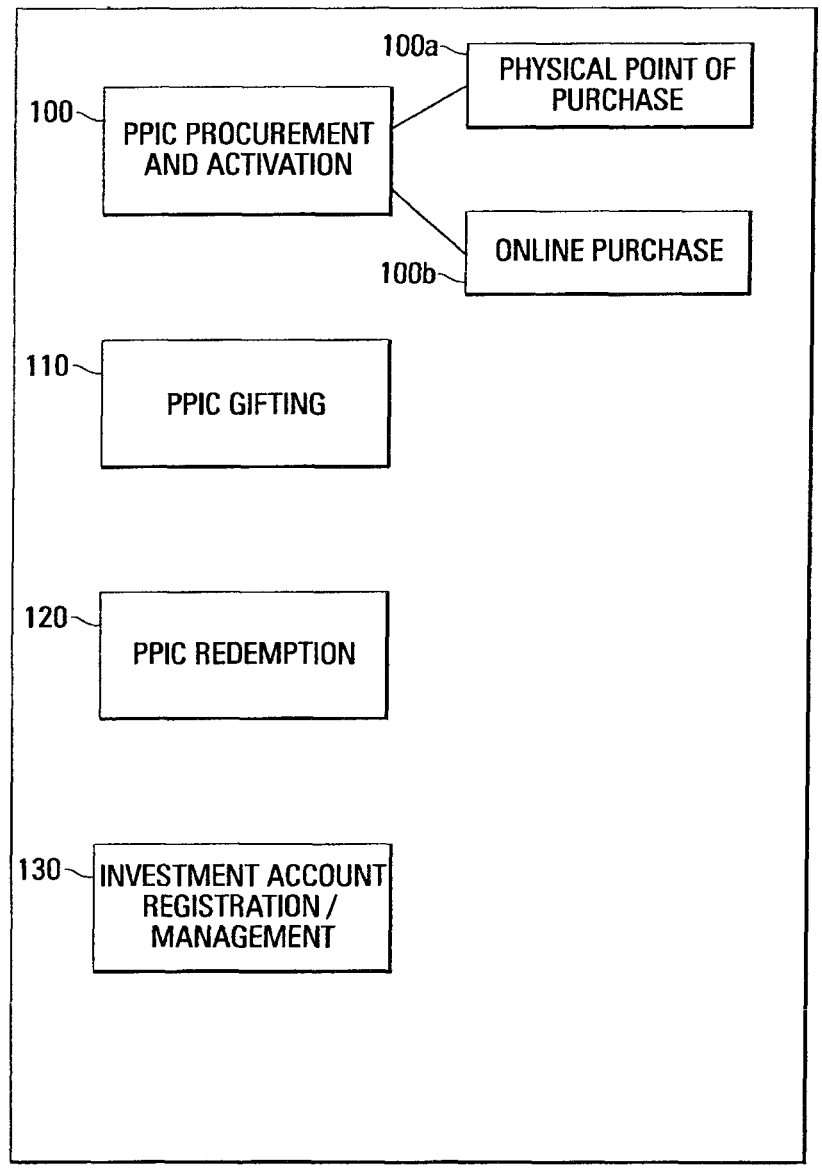
FIG. 3 is a block diagram illustrating the primary functional processes of the savings and investment program of FIG. 1.

FIG. 3 is a block diagram illustrating the primary functional processes implemented as part of the savings and investment program 10 and facilitated by the PPIC system 20 according to various embodiments of the present invention. As shown in FIG. 3, such processes include a PPIC procurement and activation process 100 including alternative point of sale and online procurement and activation processes 100a and 100b, a PPIC gifting process 110, a PPIC redemption process 120, and an investment account registration and management process 130. Each of these processes is discussed in detail below.

Figure 4A:
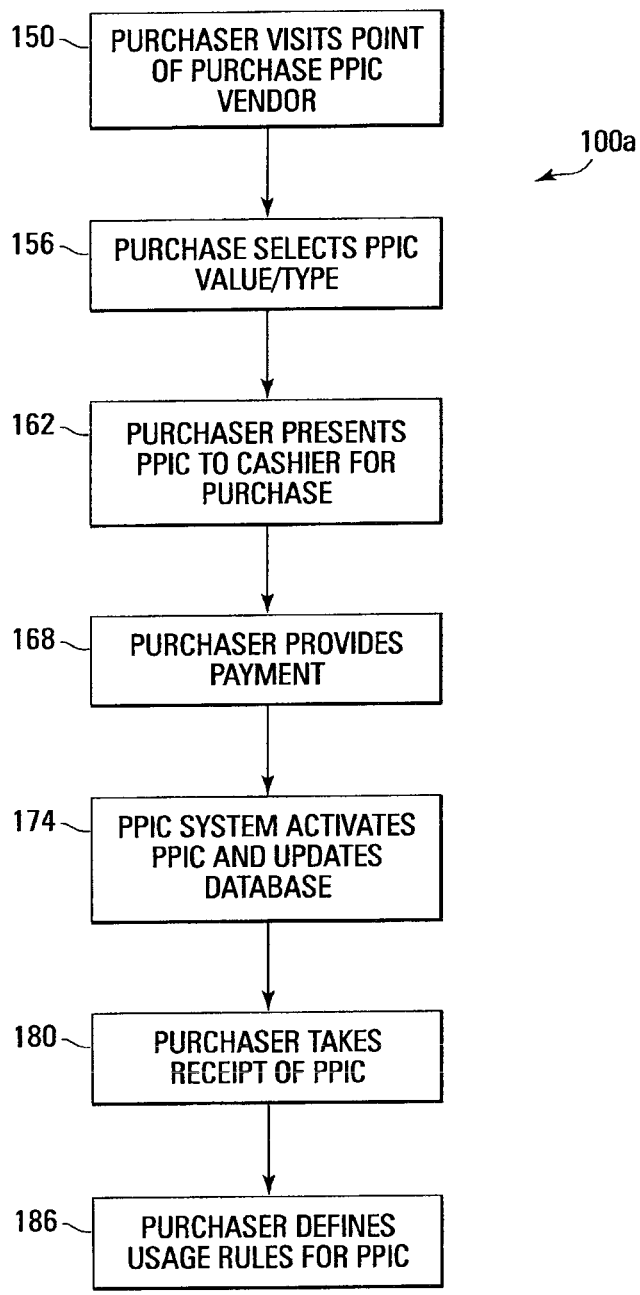
FIGS. 4A and 4B are flow charts illustrating pre-paid investment card procurement and activation processes for use in conjunction with the savings and investment program of FIG. 1 according to alternative embodiments of the present invention.
Figure 4B:
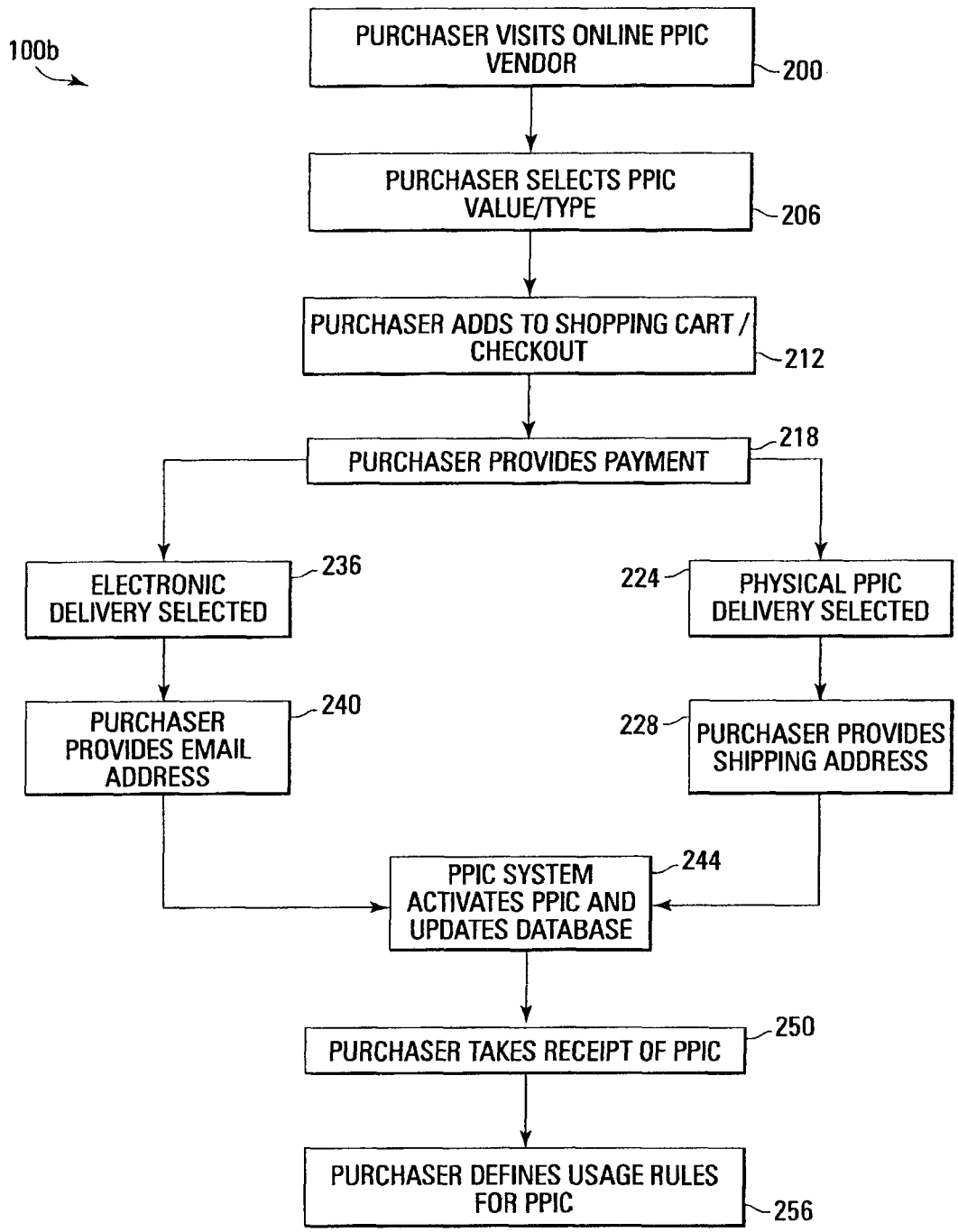

FIGS. 4A and 4B are flow charts illustrating alternative PPIC procurement and activation processes 100a and 100b utilized, respectively, at physical point of purchase locations and online PPIC vendors. As shown in FIG. 4A, when purchasing the PPIC 22 at a physical point of purchase PPIC vendor, which may be one of the partner retailers 30, a partner financial service provider 24, or other authorized PPIC vendor, the PPIC purchaser 36 initiates the procurement and activation process 100a by visiting the PPIC vendor's physical location, where he or she is exposed to the PPIC 22. (Block 150) The purchaser 36 then determines which type of PPIC 22 he or she wishes to purchase, and how many of each type. (Block 156) As discussed above, the PPICs 22 can be offered in a variety of types, e.g., pre-determined denominations, pre-determined use, customizable denomination and use, etc. Upon deciding on the type and/or denomination of PPIC 22 he or she wishes to purchase, the purchaser 36 presents the PPIC 22 to the PPIC vendor cashier (Block 162) and offers a method of payment, which may be any method accepted by the PPIC vendor. (Block 168) In various embodiments, payment may be effected using a credit card, debit card, check, or cash. The PPIC vendor may then proceed to utilize its established payment authorization process.

Upon authorizing the payment method selected by the purchaser 36, the PPIC 22 can be activated by the PPIC system 20 for subsequent redemption by the purchaser 36 and/or a PPIC recipient 40. (Block 174) Activation of the PPIC 22 can be accomplished utilizing a conventional stored value card authorization and activation method and system provided by a third party stored value card processor, such as described above. Such systems are well known in the art and readily available from third parties for integration with the PPIC system 20. In various embodiments, such known authorization and activation processes may include validating and authenticating the security number stored on the PPIC 22 memory strip utilizing the activation terminal 66 in a manner similar to those methods used to activate known pre-paid stored value cards such as phone or gift cards. As part of this process, the stored value card processing system can query the PPIC host computer 50 to confirm that the security number for the PPIC 22 that is being activated is a valid security number stored in the PPIC database 56. In various embodiments, this validation step can be performed automatically by the call processor 74 which communicates with the host computer 50 via the communication network 78.

Additionally, after validating the security number on the PPIC 22 and activating the PPIC 22, the stored value card processor then sends the PPIC company 16 an authentication message notifying the PPIC company 16 that the PPIC 22 associated with the validated security number has been activated. Upon receipt of an authentication message, the PPIC company 16 can record various additional data associated with the PPIC 22 in the host computer 50, thereby updating the corresponding records in the PPIC database 56. For example, the host computer 50 may store in the PPIC database 56 the security number, the PPIC 22 monetary value (i.e., the value stored on the activated PPIC 22), payment information, PPIC purchaser information, PPIC vendor information and location, and any other data deemed desirable by the PPIC company 16. Additionally, upon acceptance by the vendor of the payment method chosen by the purchaser 36, the purchaser 36 is given the activated PPIC 22. (Block 180)

Next, depending on the type of PPIC 22 purchased (i.e., fixed denomination/use or general use), the purchaser 36 may, choose to define usage rules for subsequent redemption of the monetary value stored on the PPIC 22 by the purchaser 36 or recipient 40. (Block 186) In one embodiment, the purchaser 36 can define the usage rules using the PPIC website 60. The usage rules are associated by the host computer 50 with the unique security or authorization number for each activated PPIC 22 and stored in a corresponding record in the database 56. The host computer 50 can then access the specified usage rules associated with a particular PPIC 22 to determine whether any attempted uses by the PPIC recipient 40 are in compliance with the rules, and can deny or limit attempted uses according to the specified usage rules.

The usage rules can relate to any aspect of the PPIC redemption process 120. In one embodiment, the PPIC purchaser 36 can specify the types of investments that may be purchased using the PPIC 22. For example, the purchaser 36 may specify that the PPIC 22 be used only for personal investments, retirement investments, savings vehicles such as passbook savings and certificates of deposit, bonds, stocks, real estate, and the like. Similarly, the PPIC purchaser 36 may specify that the PPIC 22 be used only to purchase insurance, which may or may not include an additional investment or savings aspect. In other embodiments, the PPIC purchaser 36 may specify that the PPIC 22 be used only for making political or charitable donations. In still other embodiments, the PPIC purchaser 36 may authorize the PPIC recipient 40 to gift the PPIC 22 to another PPIC recipient 40.

In some embodiments, the usage rules may relate to allocation of the monetary stored value on the PPIC 22. Thus, in one embodiment, the PPIC purchaser 36 may specify that the PPIC 22 value be allocated to different investment vehicles, e.g., savings, securities, and mutual funds, and may specify the percentage of the PPIC 22 value that may be allocated to each. By way of example, the purchaser 36 may specify that 75 percent of a PPIC gift value be allocated solely to a future retirement plan, college savings plan, trust fund, etc., with the remaining 25 percent of the value being available for other uses, which may include discretionary uses. In one such embodiment, for example, the remaining 25 percent could be converted to cash, and an ATM card could be issued to the recipient by a partner financial service provider 24. As another example, the PPIC purchaser 36 could specify that any earnings, e.g., dividends, generated by the investments purchased using the PPIC 22 stored value be made available to the recipient 40 at his or her discretion.

If desired, the PPIC purchaser 36 may delegate the usage rule definition to the recipient 40. The PPIC system 20 thus provides significant flexibility as to the ways in which the PPIC 22 may be used.

FIG. 4B illustrates the PPIC procurement and activation process 100b which may be utilized when purchasing a PPIC 22 through an online vendor. As shown in FIG. 4B, online procurement and activation process 100b is initiated by the purchaser 36 accessing a website facilitating online PPIC purchases, at which time the purchaser 36 is exposed to the PPIC 22. (Block 200) This website may be a website operated by the PPIC company 16, a partner financial service provider 24 a partner retailer 30 offering online shopping, and/or a partner e-commerce vendor. In one embodiment, the PPICs 22 can be purchased directly from the PPIC website 60 described above in addition to or in lieu of other online vendors. Next, the purchaser 36 determines which type and/or denomination of PPIC 22 he or she wishes to purchase, (Block 206) adds the PPIC 22 to his or her online shopping cart, and/or proceeds to the online checkout process as defined by the particular website utilized. (Block 212) In one embodiment, if desired, the purchaser 36 may be asked to provide personal information for use by the online vendor for providing further services, discounts, etc. to the purchaser.

In the checkout process, the purchaser 36 specifies the payment method he or she wishes to utilize. (Block 218) As will be appreciated, the payment method may include any payment method acceptable to the online vendor. In various embodiments, the payment methods may include payment using a credit card, debit card, e-check (direct debit), direct bank wire transfer, or a pre-established online payment method, e.g., Fire-pay, Paypal, Net Teller, etc. In short, any type of payment method amenable for use with online purchases may be utilized.

In the illustrated embodiment, the purchaser 36 can then specify the desired delivery method for the PPIC 22. In one embodiment, as shown, the purchaser 36 can choose to have a physical PPIC 22 delivered to him or her or to a recipient 40 of his or her choosing. (Block 224) In this embodiment, the purchaser 36 can provide the mailing address to which the PPIC 22 is to be delivered. (Block 228) Alternatively, as further shown, the purchaser 36 can choose to have the PPIC 22 delivered electronically. (Block 236) In that case, the purchaser 36 can provide an electronic mail address to which an electronic notification and an electronic security number can be sent. (Block 240) The electronic security number functions in substantially the same way as or identically to the security number on the physical PPIC 22, and will be required for subsequent redemption of the value stored on the "electronic" PPIC 22. The electronic security number can be generated either by the host computer 50 or by the stored value card processing system, depending on the desired configuration for the particular PPIC system 20.

As with the physical point of purchase procurement and activation process 100a described above, the PPIC 22 purchased online can be activated by a stored value card processor utilizing known stored value card activation systems and methods, such that the stored value is available for use immediately by the purchaser 36 or, if desired, the recipient 40. (Block 244) Similarly, the stored value card processor can notify the PPIC company 16 that the PPIC 22 has been activated. The PPIC company 16 can then record the PPIC 22 information in the PPIC database 56, including without limitation, the monetary value stored on the PPIC 22, payment information, purchaser information, security numbers, or any other information desired by the PPIC company 16. Then, depending on the type of delivery method chosen, the purchaser 36 or designated recipient then takes receipt of either the activated physical PPIC 22 or the activated "electronic" PPIC 22, along with any necessary electronic security numbers, as required, for redeeming the PPIC 22 value. (Block 250) Finally, the purchaser 36 can, if desired, define usage rules for subsequent redemption and allocation of the PPIC 22 stored value, as described above. (Block 256)

With both the physical point of purchase procurement and activation process 100a and the online procurement and activation process 100b, settlement of the PPIC purchase transaction can be effected using the stored value card processor's established settlement system and process. In one embodiment, the PPIC company 16 may receive from the stored value card processor the funds corresponding to the stored value on the purchased PPIC 22. Such funds can initially be held by the PPIC company 16 and then transferred to an account held by a financial institution, e.g., bank, of the PPIC company's choosing. In another embodiment, the foregoing bank or other financial institution may receive the transfer of funds corresponding to the stored value on the purchased PPIC 22 directly from the stored value card processor and then credit such funds to the PPIC company's account. In either case, the monetary value stored on the PPIC 22 is effectively immediately available for use by the purchase 36 or the recipient 40. In various embodiments, the PPIC company 16 may receive a commission paid by the financial institution to reflect the deposited funds held by the financial institution.

Additionally, prior to gifting the activated PPIC 22 to the recipient 40, the purchaser 36 can optionally register the activated PPIC 22 with the intended recipient's investment account maintained by the PPIC company 16 and/or one of the partner financial services providers 24. The PPIC system 20 can be configured to allow the purchaser 36 to create the investment account for the recipient 40 if one does not already exist, or optionally, can permit the purchaser 36 to associate the activated PPIC 22 with an existing investment account. For example, the purchaser 36 can access the PPIC system 20 using the PPIC website 60 to create an investment account for the future recipient 40, or to register a purchased and activated PPIC 22 and have this PPIC 22 associated with an existing investment account. Alternatively, the purchaser 36 can forego this step, in which case the recipient 40 may register the activated PPIC 22 in redeeming the value stored thereon.

Returning now to FIG. 3, the PPIC gifting process 110 will now be described in more detail. As discussed above, the purchaser 36 may choose to give the PPIC 22 to the recipient 40 in the form of a physical PPIC or as an electronic PPIC. In the case of physical PPIC gifting, the purchaser can present the PPIC 22 to the recipient 40 in whatever manner the purchaser 36 chooses, e.g., in person, via mail, delivery, etc. The recipient 40 can thereafter redeem the value stored on the PPIC 22 according to the PPIC redemption process 120 described below.

If the purchaser 36 chooses electronic gifting, no physical card is presented to the recipient 40. Instead, the recipient 40 is provided with the unique electronic security number required for redeeming the value on the electronic PPIC 22. For example, the purchaser 36 may choose to simply send this security number to the recipient 40 via an electronic mail message. However, the novel investment program of the present invention provides additional flexibility in tailoring the form of the PPIC gift according to the preferences of the purchaser 36. For example, the electronic PPIC 22 can be integrated with or otherwise presented to the recipient 40 in conjunction with an electronic greeting card provided by a partner online retailer. Other variations on the electronic PPIC gifting processes will be apparent to those skilled in the art based on the foregoing.

Figure 5:
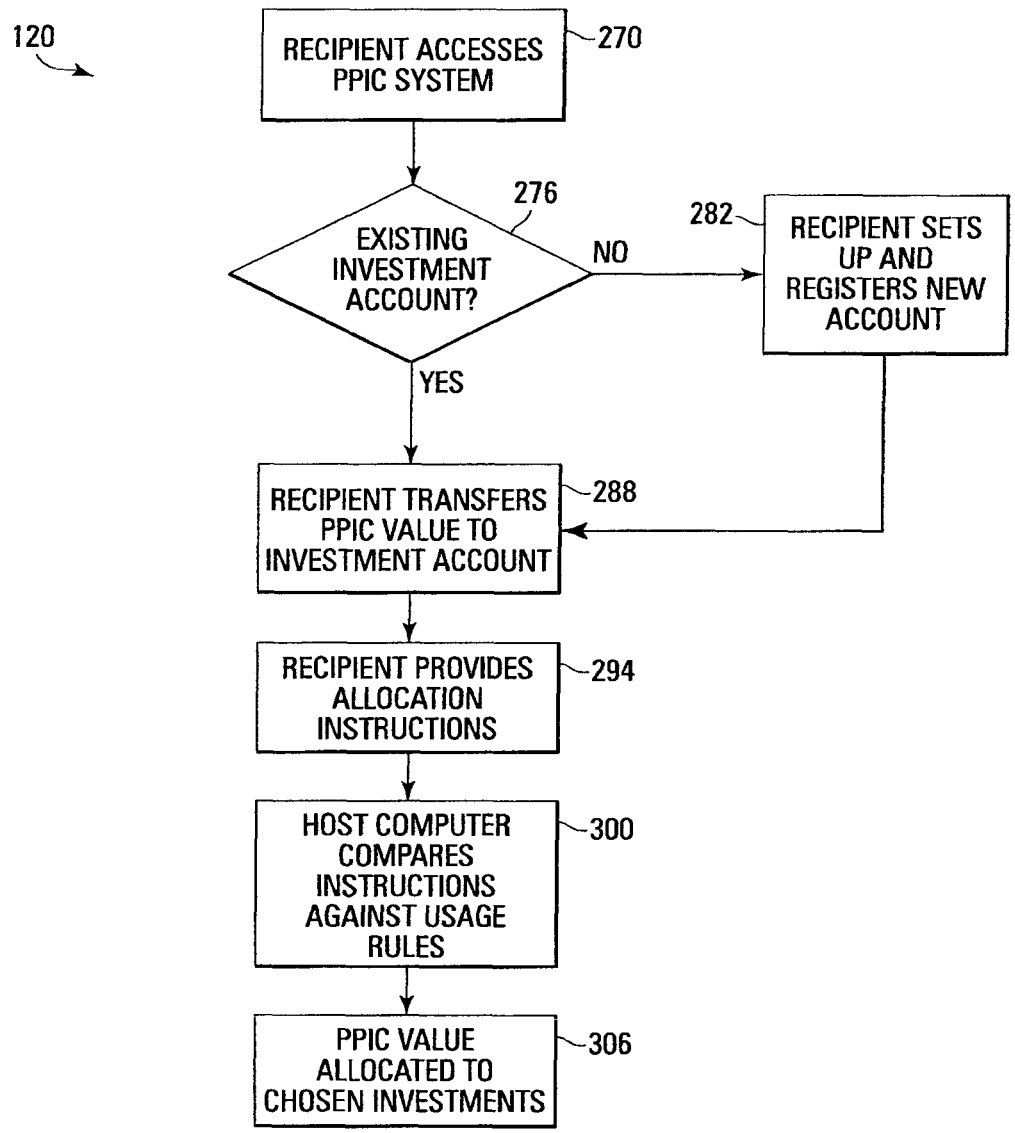
FIG. 5 is a flow chart illustrating a pre-paid investment card redemption process of the savings and investment program of FIG. 1 according to one embodiment of the present invention.

FIG. 5 is a flow chart illustrating the redemption process 120 for the PPICs 22 utilizing the PPIC website 60 according to one embodiment of the present invention. As shown in FIG. 5, the redemption process 120 includes the recipient 40 first accessing the PPIC system 20 by logging into the PPIC website 60. (Block 270) In various embodiments, this may entail providing a unique user name and password or other secure identification information. Next, it is determined whether an investment account for the recipient 40 exists in the savings and investment program 10. (Block 276) If an investment account does not exist, the recipient 40 can create a new account using the PPIC website 60. (Block 282) The recipient can then register the PPIC 22 so as to associate the PPIC 22 with his or her investment account, and can then instruct the PPIC system 20 to transfer some or all of the monetary value stored on the PPIC 22 into the investment account. (Block 288)

To deposit the value on the PPIC 22 to the investment account, the recipient 40 generally provides the security number and any other required data identifying the PPIC 22 being redeemed. The recipient 40 can then request that the deposited amounts be allocated among any of the investments available through the PPIC program 10. (Block 294) By way of example only, if the value on the PPIC 22 is $500, the recipient may request that $200 be allocated to purchase shares of a certain companies common stock, and that the remaining value be allocated to purchase a certificate of deposit. In some embodiments, the host computer 50 may compare the requested allocation against the usage rules defined by the purchaser 36 for the particular PPIC 22. (Block 300) If the requested allocations are not in compliance with the usage rules, the host computer 50 can deny some or all of the requested allocations and cause the recipient 40 to be notified accordingly. Otherwise, the host computer 50 will allow the allocations to be made. The corresponding transactions can then be effected by the PPIC company 16 and the partner financial services provider 24 in the same manner as any similar transaction, with the corresponding funds electronically transferred from the bank account of the PPIC company 16 to cover the transaction, and the recipient's investment account updated accordingly. (Block 306)

For example, if the recipient 40 elects to have the PPIC 22 value used to purchase shares of a certain mutual fund (or if the usage ruled defined by the purchaser 36 require this), the order to purchase such shares can be automatically placed through the partner financial services provider 24, which can complete the transaction as it would any other purchase of such shares. The funds covering the purchase can then be electronically transferred from the PPIC company's bank account. As another example, if the PPIC value is to be deposited into a savings account of the recipient 40, which may be an account maintained by the PPIC company 16 and/or a partner financial services provider 24, the corresponding funds can be automatically electronically transferred from the bank account of the PPIC company 16 to the savings account of recipient 40. As will be appreciated, the partner financial services providers 24 and/or the PPIC company 16 may generate revenues in the forms of fees and commissions resulting from the actual purchase of the specified investment vehicles.

It is emphasized, however, that although the PPIC website 60 provides the primary interface to the PPIC system 20 for redeeming the value on the PPIC 22, in various other embodiments of the present invention, the PPIC 22 can be redeemed in other ways. For example, the PPIC 22 value can optionally be redeemed and deposited into the recipient's investment account directly through a partner financial services provider 24 (either in person or through the financial services provider's website, which can be interfaced with the PPIC system 20 and linked to the PPIC database 56), or telephonically with a financial services representative provided by the PPIC company 16 and/or the financial services provider 24. Other redemption methods can be provided as determined by the PPIC company 16 and/or the partner financial services providers 24 without deviating from the scope of the present invention.

Returning to FIG. 3, the investment account registration and management process 130 will now be discussed in greater detail. The PPIC system 20 provides broad flexibility to the PPIC purchasers 36 and recipients 40 for establishing new investment accounts and managing existing accounts. For example, new investment accounts can be established and registered online through the PPIC website 60 or through a partner financial services provider's website. Alternatively, new investment accounts can be established and registered in the PPIC system 20 through direct interaction with a representative, e.g., a financial advisor, associated with the PPIC company 16 and/or the partner financial services provider 24. The new investment accounts can be established by the purchaser 36 for himself or herself or for the benefit of a PPIC recipient 40. Alternatively, the purchaser 36 can choose to delegate the investment account establishment to the recipient 40.

Similarly, ongoing management of the investment accounts can be tailored to fit the needs and preferences of the purchaser 36. For example, in one embodiment, the purchaser 36 may choose to make all investment account management decisions for the recipient 40, including decisions regarding allocation of the redeemed PPIC value. Alternatively, the purchaser 36 could delegate some or all of the investment account management decisions to the recipient 40 himself or herself, or to a legal custodial manager, e.g., a parent or guardian, of the recipient 40. Of course, the purchaser 36 can also delegate different investment account management responsibilities to different individuals. For example, the purchaser 36 may choose to retain control over decisions regarding investment allocation and disposition, but delegate control over updating personal information, e.g., address, social security number, etc., to the recipient 36.

The PPIC system 20 may also be configured to allow the purchaser 36 and/or the recipient 40 to make deposits to the investment account and make additional investments using means, e.g., cash, check, or electronic fund transfer, other than the PPICs 22. For example, the recipient 40 may desire to purchase additional shares of stock of a particular company beyond those that can be purchased using the stored value on a PPIC 22 he or she has redeemed. In such a case, the recipient 40 may pay for these additional stock purchases using funds other than those on the PPIC 22, and the acquired stock can be integrated into the recipient's investment portfolio. In short, the PPIC system 20 provides broad flexibility with respect to how investment accounts are established and maintained.

The PPIC system 20 may also be configured to provide the purchaser 36, the recipient 40, or designated custodian a wide range of reports or other tools to assist in managing the investment accounts. For example, the PPIC system 20 may be configured to generate written statements that can be mailed to the purchaser 36 or recipient on a predetermined schedule. Similarly, the PPIC website 60 can include utilities for generating online statements, investment performance charts, etc. Thus, the PPIC system 20 can be configured to provide any amount of reporting deemed appropriate by the PPIC company 16.

It will be appreciated that numerous variations of the basic PPIC system 20 and savings and investment program 10 can be designed within the scope of the present invention. For example, in one embodiment, the PPIC 22 may be a co-branded card issued in cooperation with a sponsor entity. In this embodiment, the sponsor may offer to add funds to the PPIC 22, or alternatively, directly to the investment account of the PPIC recipient 40, based upon the dollar value amount of purchases made by the purchaser 36 or the recipient 40 with the sponsor/partner. These "matched or additional funds" may apply to all purchases made or only to certain categories of purchases made from the sponsor. The "matched or additional funds" may, in one embodiment, be calculated in a manner specified by the terms of the sponsors agreement with the PPIC company 16, or otherwise or disclosed to the purchaser 36 (e.g., in a separate form or advertisement provided to the purchaser 36 by the sponsor). For example, the sponsor may offer a flat percentage or a specified dollar amount based on purchases made. The sponsor calculates the "matched or additional funds" due the purchaser 36 or the recipient 40 based on the offered incentive program, and these funds can be stored on the appropriate PPIC 22 through the PPIC system 20.

In another embodiment of the present invention, the savings and investment program 10 is a goal-based savings and investment program, or includes a goal-based aspect. In this embodiment, savings or investment goals are defined at the time of the investment account creation or at any time thereafter. Additionally, restrictions on investment account usage can then be defined for facilitating achieving the investment goals. In one embodiment, the investment account established in the PPIC system 20 is a goal-based account. In other embodiments, the investment account may include one or more sub-accounts that are goal-based. Again, the PPIC system 20 provides significant flexibility in tailoring the investment program to suit the needs and desires of the user.

Such a goal-based program advantageously provides focus and structure to encourage disciplined savings, and can be readily integrated with the PPIC system 20 and the use of PPICs 22. Alternatively, even where PPICs 22 are not utilized, the goal-based investment program provides significant advantages in assisting the program participants in achieving investment goals. The investment goals are not limited to any type of goal or objective, and can include, without limitation, savings for purchasing a home, car, vacation, education, retirement, or emergencies.

Figure 6:
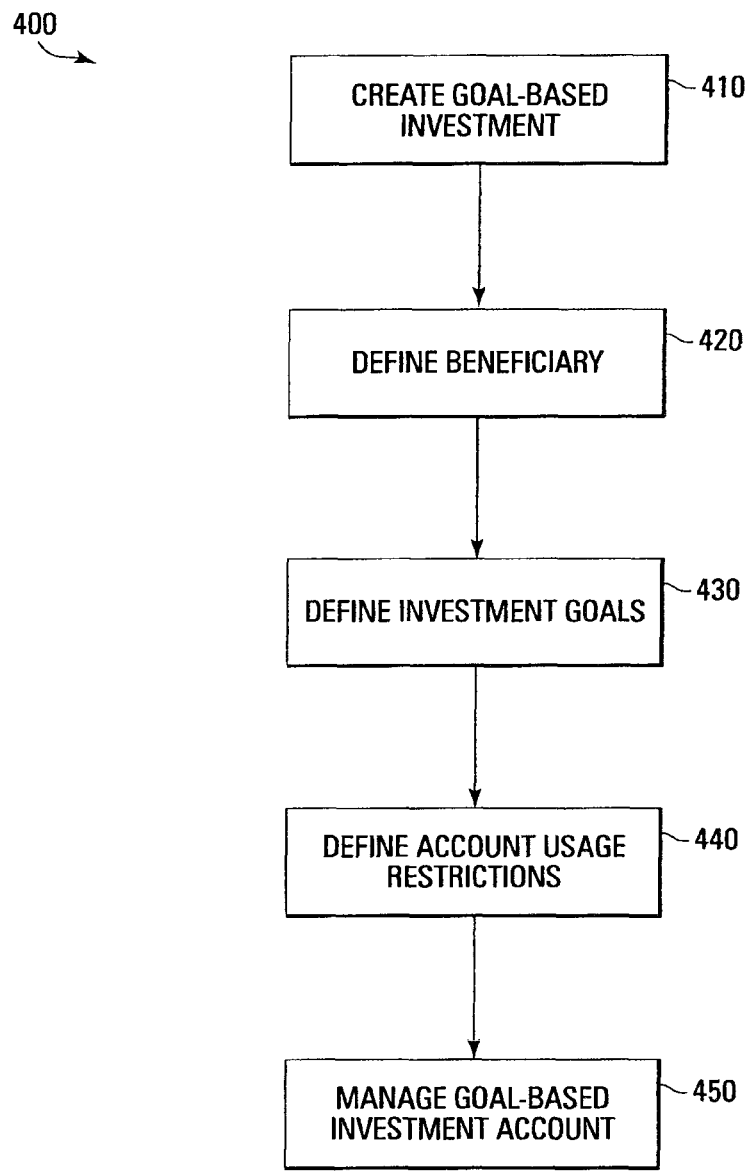
FIG. 6 is a flow chart illustrating a goal-based savings and investment program according to another embodiment of the present invention.

FIG. 6 is a flow chart illustrating the steps associated with creating and using a goal-based savings and investment program 400 according to one embodiment of the present invention. As shown in FIG. 6, the goal-based savings and investment program includes first creating a goal-based investment account. (Block 410). The goal-based investment account can be created in substantially the same or identical manner as the investment accounts described above for use in connection with the PPICs 22. For example, the goal-based investment account can be created using the PPIC website 60, or by speaking directly with a representative of a participating financial services provider. The creator of the goal-based investment account can be any individual or entity desiring to establish a goal-based investment account for himself or herself, or for a designated beneficiary. For example, the account creator can be a PPIC purchaser 36. As discussed above, the goal-based investment account can be a primary investment account or can be a sub-account associated with a broader investment account, e.g., an investment account established in connection with a PPIC 22.

Next, a beneficiary for the goal-based investment account is defined by the account creator. (Block 420) As may be appreciated, the beneficiary can be any individual or entity, e.g., corporation or other organization, for whom the creator wishes to establish a goal-based investment account.

Next, the investment goals are defined for the goal-based investment account. (Block 430) Again, the investment goals can be defined using the PPIC website 60 or any other user interface to the PPIC system 20. As discussed above, the goal-based investment program 400 can accommodate any investment or savings goals, including without limitation, a specific investment portfolio value, savings for purchasing real estate, savings for a particular product (e.g., a car, motorcycle, television, etc.), savings for retirement, savings for education, savings for starting a business, education, or any other desired goal.

Next, the account creator can define account usage restrictions using the PPIC website 60 or other user interface. (Block 440). The account usage restrictions can be defined in much the same or identical manner as the PPIC 22 usage rules described above. The account usage rules can take on any form as deemed appropriate by the account creator. For example, in various embodiments, the account usage restrictions may impose penalties on withdrawals made prior to achieving one or more of the defined investment goals. In such embodiments, the penalties may include pre-defined fees and/or forfeiture of some or all of the account earnings or of incentives provided by participating financial services providers or third parties. As another exemplary restriction, the account usage rules can also require a co-signer for making withdrawals from the goal-based investment account. Such restrictions may be particularly useful where the beneficiary is a minor, although they can be readily utilized for other classes of beneficiaries. In still other embodiments, the account usage restrictions may place limits on withdrawals from the goal-based investment account. For example, the account usage restrictions can specify that only a certain proportion of the value of the account can be withdrawn prior to reaching the defined goals. Alternatively, the usage restrictions can set a minimum time period between withdrawals. In still other embodiments, the account usage restrictions may call for weighted distribution of deposits in the account across multiple goal-based investment accounts. Still other types of account usage restrictions can be defined and will be apparent based on the foregoing.

The goal-based investment account can thereafter be managed by the account creator and/or the beneficiary as appropriate using the PPIC website 60 or other user interface. (Block 450) Ongoing account management can entail any variety of activities including, without limitation, checking the goal-based savings account balance, defining additional investment goals, reviewing and/or redeeming available promotions and/or incentives provided by partnering financial services providers 24 and/or partner retailers 30, establishing and defining weighted distribution of new investment funds across different goal-based investment accounts, reviewing progress toward the defined goals, making withdrawals, and closing the accounts. In addition, the PPIC system 20 may be configured to provide any desired reports to the beneficiary and/or the account creator.

Thus, the savings and investment program 10 and the PPIC system 20 according to the various embodiments of the present invention provide substantial advantages over traditional investment systems. The savings and investment program 10 and the PPIC system 20 provide an elegant, economical and simple way for individuals to set aside investment funds for their own use or for use by designated recipients 40. The PPIC system 20 allows the purchaser 36 flexibility in designating how the PPICs 22 can be used, which flexibility is not available in other forms of gifts such as cash. Additionally, providing the PPICs 22 for purchase through the partner retailers 30 (whether at their physical locations or online) is a convenient way for the purchasers 36 to make investments, either for themselves or the recipients 40. Indeed, in some cases, the purchasers 36 can make these investment purchases in conjunction with other activities, e.g., grocery shopping.

Additionally, partnering with the financial services providers 24 and/or the retailers 30 provides substantial benefits to these entities. For example, it exposes the purchasers 36 and/or the recipients 40 to the products and services provided by those entities, and provides the opportunity for the financial services providers 24 and/or retailers 30 to bundle the PPICs 22 with other products and offer incentives for purchasers 36 to purchase such additional products. Other benefits and advantages provided by the savings and investment program 10 and the PPIC system 20 according to the various embodiments of the present invention will become apparent based on the foregoing.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What is claimed is:

1. A method of administering a goal based savings and investment program comprising:
   providing one or more prepaid investment cards (PPICs), each PPIC having a security number associated therewith;
   activating, via one or more computers, at least one PPIC, the activated PPIC having a monetary value associated therewith and redeemable through the goal based savings and investment program, wherein at least a portion of the monetary value is transferable to a goal based investment account associated with a recipient of the PPIC and wherein the goal based saving and investment program and goal based investment account are configured to encourage saving and facilitate achievements of one or more investment goals associated with the goal based investment account via the PPIC by at least in part, enforcing, at least one defined usage restriction;
   creating, via the one or more computers, the goal based investment account for the recipient of the activated PPIC;
   associating, via one or more computers, the activated PPIC with the goal based investment account;
   transferring, via one or more computers, at least a portion of the monetary value of the PPIC to the goal based investment account; and
   allocating, via one or more computers, the transferred monetary value to at least one [specified] investment associated with the goal based investment account in accordance with the at least one defined account usage restriction.

2. The method of claim 1 and further comprising associating at least one usage rule with the activated PPIC.

3. The method of claim 2 wherein allocating the transferred monetary value includes allocating the transferred monetary value according to the at least one usage rule.

4. The method of claim 3 wherein the at least one usage rule is defined at least in part by a purchaser of the activated PPIC.

5. The method of claim 1 wherein the at least one [specified] investment is selected from the group consisting of a stock purchase, a mutual fund share purchase, and a saving account deposit.

6. The method of claim 1 and further comprising associating a plurality of usage rules with the activated PPIC.

7. The method of claim 6 wherein allocating the transferred monetary value includes allocating the transferred monetary value to a plurality of specified investments according to the usage rules.

8. The method of claim 1 further comprising the step of providing a plurality of PPICs the plurality of PPICs being at one of a participating financial services provider and a participating retailer.

9. The method of claim 8 wherein at least some of the PPICs are physical PPICs made substantially of at least one of plastic and cardboard, and include a magnetic strip on which the respective security number is stored.

10. The method of claim 9 wherein activating the at least one PPIC includes:
    obtaining the security number stored on the magnetic strip using a magnetic card reader on an activation terminal located at [at] least one of the participating financial services provider and the participating retailer; and
    querying a host computer to confirm that the obtained security number is a valid security number.

11. The method of claim 8 wherein at least one of the PPICs is a paper receipt on which the security number is printed.

12. The method of claim 8 wherein at least some of the PPICs are electronic PPICs, and wherein the participating retailer includes an online retailer.

13. The method of claim 8 further comprising providing a user interface accessible by at least one of the recipient and a purchaser of the activated PPIC for creating the investment account and causing the activated PPIC to be associated with the investment account.

14. The method of claim 1 wherein the PPICs include prepaid stored value cards.

15. The method of claim 1 wherein activating the at least one PPIC includes confirming that the at least one PPIC has a valid security number.

16. The method of claim 1 wherein the monetary value is a predetermined monetary value.

* * * * *